W. E. BOCK.
METHOD OF FORMING WORM GEARS.
APPLICATION FILED MAY 11, 1914.

1,305,437.

Patented June 3, 1919.
2 SHEETS—SHEET 1.

WITNESSES:
W. K. Ford
James P. Barry

INVENTOR
William Emil Bock
BY
Whittemore Hulbert & Whittemore
ATTORNEYS

W. E. BOCK.
METHOD OF FORMING WORM GEARS.
APPLICATION FILED MAY 11, 1914.

1,305,437.

Patented June 3, 1919.
2 SHEETS—SHEET 2.

WITNESSES:

INVENTOR
William Emil Bock
BY
Whittemore Hulbert & Whittemore
ATTORNEYS

UNITED STATES PATENT OFFICE.

WILLIAM EMIL BOCK, OF TOLEDO, OHIO, ASSIGNOR TO THE BOCK WORM GEAR COMPANY, OF CLEVELAND, OHIO, A CORPORATION OF OHIO.

METHOD OF FORMING WORM-GEARS.

1,305,437.  Specification of Letters Patent.  Patented June 3, 1919.

Application filed May 11, 1914. Serial No. 837,933.

*To all whom it may concern:*

Be it known that I, WILLIAM EMIL BOCK, a citizen of the United States of America, residing at Toledo, in the county of Lucas and State of Ohio, have invented certain new and useful Improvements in Methods of Forming Worm-Gears, of which the following is a specification, reference being had therein to the accompanying drawings.

The invention relates to worm gears of that type adapted for coöperation with gears having roller teeth. It is the object of the invention to obtain a construction in which the spiral bearing face of the worm maintains a true rolling contact with the roller teeth from the point of entering engagement to the point of disengagement. It is a further object to obtain a simple method of producing a worm of this character.

In the drawings:—

The particular type of worm gearing to which my improved construction is applicable is that in which the worm wheel is provided with roller teeth having their axes parallel to the axis of the wheel and projecting laterally from the face of the wheel. The worm is arranged at the side of the worm gear with its axis transverse to the gear axis, and in operation the roller teeth successively engage the spiral face of the worm, a plurality of the rolls being in engagement with the same face at the same time. By reason of the circular orbit of the roller teeth, the direction of movement varies in angular relation to the axis of the worm, and consequently the successive convolutions of the spiral are not of the same pitch. Furthermore, the rolls not only move longitudinally of the worm but transversely with respect to the axis thereof and also in and out with respect to the periphery of the worm. This variation renders the formation of the worm by methods heretofore employed exceedingly difficult, but by my improved method the difficulties are overcome and the work may be performed with extreme accuracy.

Figure 1:
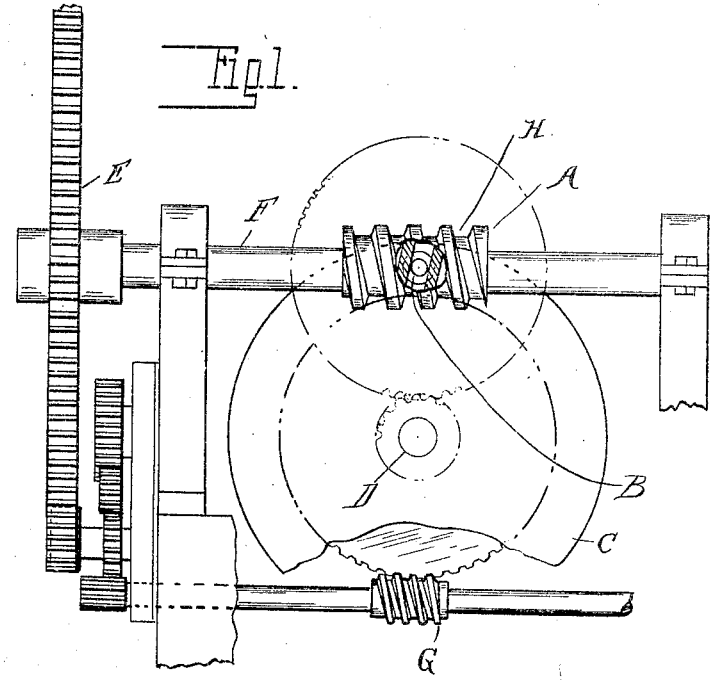
Figure 1 is a side elevation of the worm, in connection with the cutter and coöperating mechanism for controlling the same.
Figure 2:
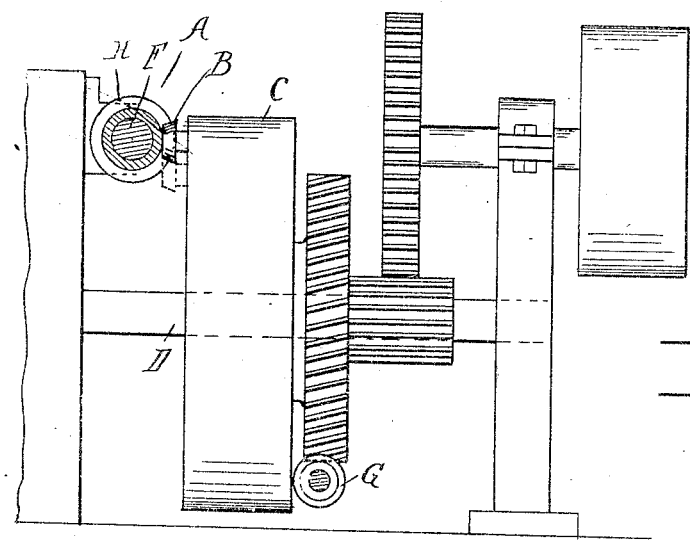
Fig. 2 is a view at right angles to Fig. 1.
Figure 3:
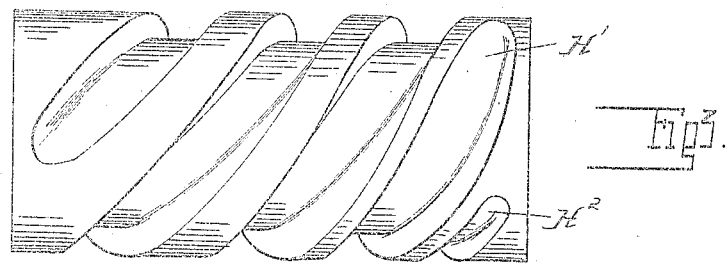
Fig. 3 is a side elevation of the worm in modified construction.

As shown in Fig. 1, A is the worm, formed with its spiral face of progressively changing pitch, so that the distance between successive convolutions is correspondingly changed. To cut the worm in this form it is necessary that the cutting tool should move not only longitudinally with respect to the axis of the worm during the rotation thereof, but also laterally. This I accomplish in a simple manner by mounting the rotary cutter B upon a suitable carrier, such as the disk C, which rotates about a center D, the radius of the path through which the cutter passes corresponding to the radius of the gear in coöperation with which the worm is to be used. The disk C is also rotated simultaneously with the rotation of the worm blank and in predetermined timed relation thereto, as by means of timed connecting gearing E between the worm arbor F and mechanism, such as worm gearing G, for rotating the disk. As a consequence the groove H cut by the rotary cutter B will be of a width corresponding to the diameter of said cutter, but the faces of said groove will vary in pitch, as above described.

Where desired, worms may be cut by my improved method so as to be provided with a plurality of separate grooves, such as H' H² Fig. 3. These are cut in the same manner as previously described and in use will coöperate with the roller teeth of the gear to maintain a larger number of said teeth in action at the same time.

Figure 4:
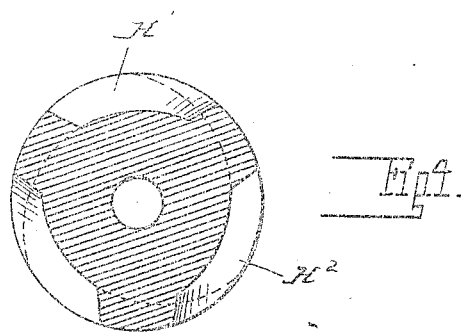
Fig. 4 is a cross section.

As indicated in Fig. 4, the grooves in the worm progressively increase in depth from the point of entrance toward the longitudinal center and then decrease in depth from this point to the point of disengagement.

What I claim as my invention is;—

1. The method of cutting worms with the spiral face thereof of progressively changing pitch, comprising the rotation of the worm blank, and the simultaneous movement of the cutter longitudinally and transversely of the axis of said blank and in engagement therewith.

2. The method of cutting worms with the spiral face thereof of progressively changing pitch, comprising the rotation of the worm blank about the axis thereof, and the simultaneously movement of the cutter longitudinally of the blank and laterally into and out from engagement therewith.

3. The method of cutting worms with the spiral face thereof of progressively changing pitch, comprising the rotation of the worm blank about the axis thereof, and the simultaneous movement of the cutter in engagement with said blank through a circular orbit at one side of the axis of said blank and parallel to a plane tangent to the periphery thereof.

4. The method of cutting worms with the spiral face thereof of progressively changing pitch, comprising the rotation of the worm blank about the axis thereof, and the simultaneous movement of the cutter in a circular orbit in a plane at one side of the axis of the blank and into and out from engagement therewith.

5. The method of cutting a worm, which consists in rotating the work and effecting a cut therefrom along a circular path of movement to which a given axial plane of the worm is ever tangential.

6. The method of cutting a worm, which consists in rotating the work, rotating a cutter in operative proximity to such work, and imparting to the cutter a generative movement in a plane parallel to a given axial plane of the work.

7. The method of cutting a worm, which consists in effecting rotations of the work and a cutter having transversely directed axes, revolving the cutter in a generating circle and bringing the work and cutter into operative engagement such that the axis of rotation of the cutter is revolved tangentially to the horizontal plane of the work.

8. A method of cutting a worm which consists in rotating the work and revolving a cutter in operative engagement therewith around a generating circle in such a manner that the horizontal plane of the work includes the tangent to such circle.

In testimony whereof I affix my signature in presence of two witnesses.

WILLIAM EMIL BOCK.

Witnesses:
ADELAIDE I. ADAMS,
JAMES P. BARRY.